United States Patent
Oka

(10) Patent No.: US 7,926,956 B2
(45) Date of Patent: Apr. 19, 2011

(54) IMAGE FORMING APPARATUS, METHOD OF CONTROLLING SAME, AND PROGRAM

(75) Inventor: Daizo Oka, Kanagawa (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 12/166,461

(22) Filed: Jul. 2, 2008

(65) Prior Publication Data

US 2009/0035000 A1    Feb. 5, 2009

(30) Foreign Application Priority Data

Aug. 3, 2007    (JP) .................................. 2007-203475

(51) Int. Cl.
G03B 21/14    (2006.01)

(52) U.S. Cl. .......................................................... 353/85

(58) Field of Classification Search .............. 353/31–37, 353/85; 349/5, 7, 8, 9
See application file for complete search history.

(56) References Cited

U.S. PATENT DOCUMENTS

| | | | |
|---|---|---|---|
| 947,490 A | 1/1910 | Gwozdz | |
| 3,772,565 A | 11/1973 | Lenz et al. | |
| 5,153,419 A | 10/1992 | Takahashi | |
| 6,169,377 B1 | 1/2001 | Bryde et al. | |
| 6,184,632 B1 | 2/2001 | Kamata et al. | |
| 6,268,799 B1 | 7/2001 | Miyashita et al. | |
| 6,317,171 B1 | 11/2001 | Dewald | |
| 6,409,350 B1 * | 6/2002 | Kakimoto et al. | 353/85 |
| 6,448,715 B1 | 9/2002 | Fujiwara et al. | |
| 6,467,911 B1 | 10/2002 | Ueyama et al. | |
| 6,690,282 B2 | 2/2004 | Miyashita et al. | |
| 6,779,896 B2 * | 8/2004 | Luerkens et al. | 353/84 |
| 6,802,615 B2 | 10/2004 | Okada | |
| 6,827,453 B2 | 12/2004 | D'Alessio et al. | |
| 6,891,338 B2 | 5/2005 | Kubo | |
| 6,956,490 B2 | 10/2005 | Childers | |
| 6,982,529 B2 | 1/2006 | Belliveau | |
| 7,006,004 B2 | 2/2006 | Miyashita et al. | |

(Continued)

FOREIGN PATENT DOCUMENTS

CN    1461147    12/2003

(Continued)

OTHER PUBLICATIONS

U.S. Appl. No. 12/029,106, filed Feb. 11, 2008, Shirasu, et al.

(Continued)

*Primary Examiner* — William C Dowling
(74) *Attorney, Agent, or Firm* — Oblon, Spivak, McClelland, Maier & Neustadt, L.L.P.

(57) ABSTRACT

Disclosed herein is an image forming apparatus that emits a beam corresponding to an image onto an image-projected object to allow the image to be formed thereon. The apparatus includes: a lamp; a lamp power supply; a lens; a brightness sensor that measures a lamp brightness; a memory that stores, as a reference brightness value, the lamp brightness measured at a first time when brightness of the beam on the image-projected object has reached a target value; and a control circuit. At a second time, the control circuit performs first control of generating or updating and storing correspondence information. At a third time, the control circuit performs second control of identifying a level of an output power of the lamp power supply corresponding to the reference brightness value, and driving the lamp power supply with the identified level of the output power.

10 Claims, 7 Drawing Sheets

U.S. PATENT DOCUMENTS

| | | |
|---|---|---|
| 7,045,984 B2 | 5/2006 | Gonschor |
| 7,083,287 B2 | 8/2006 | Pate |
| 7,088,058 B2 | 8/2006 | Shiota et al. |
| 7,377,658 B2 | 5/2008 | Jayaram et al. |
| 7,391,475 B2 * | 6/2008 | Pate et al. .............. 348/602 |
| 7,589,695 B2 | 9/2009 | Tanaka |
| 2002/0005697 A1 | 1/2002 | Morgan et al. |
| 2003/0227765 A1 | 12/2003 | Kubo |
| 2004/0263800 A1 | 12/2004 | Childers |
| 2005/0110958 A1 * | 5/2005 | Schwartz et al. ............ 353/85 |
| 2005/0243287 A1 | 11/2005 | Pate et al. |
| 2006/0087622 A1 | 4/2006 | Brown |
| 2006/0170880 A1 * | 8/2006 | Dambach et al. ............ 353/84 |
| 2006/0170882 A1 * | 8/2006 | Schwartz et al. ............ 353/85 |
| 2007/0075647 A1 | 4/2007 | Tsintzouras et al. |
| 2007/0103650 A1 * | 5/2007 | Takagi et al. ............... 353/85 |
| 2008/0218701 A1 | 9/2008 | Shirasu et al. |
| 2008/0225241 A1 * | 9/2008 | Chen et al. .................. 353/85 |
| 2008/0246927 A1 * | 10/2008 | Inoue et al. ................. 353/85 |
| 2008/0291404 A1 | 11/2008 | Shirasu et al. |
| 2008/0297736 A1 | 12/2008 | Shirasu et al. |
| 2009/0035000 A1 | 2/2009 | Oka |
| 2009/0122276 A1 | 5/2009 | Ito |
| 2010/0110395 A1 | 5/2010 | Kotani et al. |
| 2010/0128226 A1 * | 5/2010 | Shibasaki .................... 353/31 |

FOREIGN PATENT DOCUMENTS

| | | |
|---|---|---|
| EP | 1 740 022 A1 | 1/2007 |
| JP | 63-243930 | 10/1988 |
| JP | 5-260423 | 10/1993 |
| JP | 2000-314919 | 11/2000 |
| JP | 2001-21994 | 1/2001 |
| JP | 2002-311503 | 10/2002 |
| JP | 2002-357866 | 12/2002 |
| JP | 2003-324670 | 11/2003 |
| JP | 2003-348496 | 12/2003 |
| JP | 2004-85749 | 3/2004 |
| JP | 2004-239933 | 8/2004 |
| JP | 2004-309543 | 11/2004 |
| JP | 2005-19137 | 1/2005 |
| JP | 2005-148123 | 6/2005 |
| JP | 2005-181591 | 7/2005 |
| JP | 2006-3403 | 1/2006 |
| JP | 2006-120654 | 5/2006 |
| JP | 2006-173022 | 6/2006 |
| JP | 2006-185924 | 7/2006 |
| WO | WO 2005/043955 A2 | 5/2005 |

OTHER PUBLICATIONS

U.S. Appl. No. 12/035,835, filed Feb. 22, 2008, Shirasu, et al.

U.S. Appl. No. 12/038,482, filed Feb. 27, 2008, Morikawa, et al.

Office Action mailed Jun. 11, 2010, in co-pending U.S. Appl. No. 12/029,106.

Office Action mailed Jul. 6, 2010, in co-pending U.S. Appl. No. 12/038,482.

Notice of Allowability mailed Aug. 23, 2010, in co-pending U.S. Appl. No. 12/037,528.

Notice of Allowability mailed Sep. 3, 2010, in co-pending U.S. Appl. No. 12/037,330.

Office Action issued Feb. 19, 2009, in Japan Patent Application No. 2007-060440.

Office Action issued Mar. 18, 2009, in Japan Patent Application No. 2007-060441.

Office Action issued Mar. 9, 2010, in Japan Patent Application No. 2007-060441.

Office Action mailed Oct. 21, 2010, in co-pending U.S. Appl. No. 12/035,835.

Extended European Search Report issued Jul. 7, 2008, in Application No. 08250787.2 - 2206.

* cited by examiner

FIG. 4
| LAMP POWER | LAMP BRIGHTNESS VALUE (e.g., 10-BIT VALUE OBTAINED BY BRIGHTNESS SENSOR (0 TO 1023)) |
|---|---|
| 50% | 500 |
| 60% | 580 |
| 70% | 650 |
| 80% | 800 |
| 90% | 920 |
| 100% | 1000 |
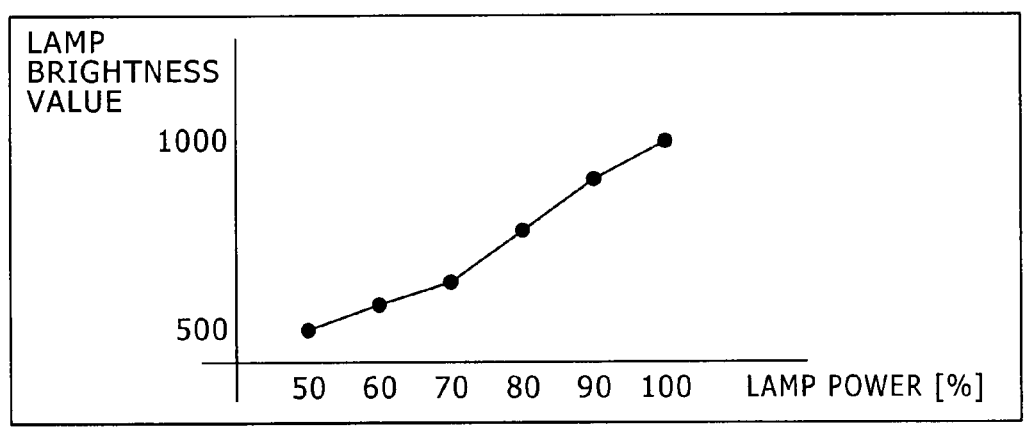

IMAGE FORMING APPARATUS, METHOD OF CONTROLLING SAME, AND PROGRAM

CROSS REFERENCES TO RELATED APPLICATIONS

The present invention contains subject matter related to Japanese Patent Application JP 2007-203475, filed in the Japan Patent Office on Aug. 3, 2007, the entire contents of which being incorporated herein by reference.

BACKGROUND OF THE INVENTION

1. Field of the Invention

The present invention relates to an image forming apparatus, a method of controlling the same, and a program. In particular, the present invention relates to an image forming apparatus that allows brightness on a screen to be adjusted easily, a method for controlling the same, and a program.

2. Description of the Related Art

In the past, video contents, such as movies in movie theaters, were commonly projected by a film projector or the like on a screen.

In recent years, with the development of the digitization technology for the video contents, study in and development of so-called digital cinema technology have been continuing. The digital cinema technology refers to a technology of utilizing a projector (see Japanese Patent Laid-open No. Hei 05-260423, for example) in the movie theater or the like. Projectors that can be used in the digital cinema technology will be hereinafter referred to particularly as "cinema projectors".

In the cinema projectors, as compared with existing film projectors or the like, achievement of "daily operations with little need for human labor" and "time- and trouble-saving, simple and accurate adjustment" is demanded. Their achievement is demanded not only in terms of the cinema projector alone but also in terms of a whole system that includes the cinema projector. Their achievement is demanded in connection with the adjustment of the brightness on the screen, for example.

SUMMARY OF THE INVENTION

At present, the adjustment of the brightness on the screen, i.e., adjustment for keeping the brightness on the screen at a reference brightness value, is conducted in the following manner. First, before screening or at the time of regular maintenances, a human user measures the brightness on the screen using a measuring instrument. Then, based on a result of this measurement, the user adjusts a lamp power of the cinema projector to keep the brightness on the screen at the reference brightness value for screening.

This manner of adjusting the brightness on the screen requires a lot of time and effort on the part of the user and a high system cost. That is, the achievement of "daily operations with little need for human labor" and "time- and trouble-saving, simple and accurate adjustment" is difficult with the above existing method of adjusting the brightness on the screen.

The present invention addresses the above-identified, and other problems associated with existing methods and apparatuses, and makes it possible to achieve "daily operations with little need for human labor" and "time- and trouble-saving, simple and accurate adjustment" in connection with the adjustment of the brightness on the screen.

According to one embodiment of the present invention, there is provided an image forming apparatus that emits a beam corresponding to an image onto an image-projected object to allow the image to be formed on the image-projected object. The image forming apparatus includes: a lamp configured to serve as a light source for the beam emitted onto the image-projected object; a lamp power supply configured to drive the lamp; a lens configured to focus the beam emitted from the lamp upon the image-projected object; and a brightness sensor configured to measure brightness of direct or indirect light in a light path from the lamp to the lens, as a lamp brightness. The image forming apparatus further includes a memory configured to store, as a reference brightness value, the lamp brightness measured by the brightness sensor at a first time when brightness of the beam on the image-projected object has reached a target value; and a control circuit configured to control the image forming apparatus. At a second time later than the first time, the control circuit performs first control of a) varying an output power of the lamp power supply and obtaining the lamp brightness measured by the brightness sensor for respective levels of the output power, and b) generating or updating correspondence information that indicates a correspondence between a change in the output power of the lamp power supply and a change in the lamp brightness at the second time, based on the values obtained. The control circuit further performs first control of c) storing the generated or updated correspondence information in the memory. At a third time later than the second time, the control circuit performs second control of loading the reference brightness value and the correspondence information from the memory, identifying a level of the output power of the lamp power supply corresponding to the reference brightness value based on the correspondence information, and driving the lamp power supply with the identified level of the output power.

In the image forming apparatus, the method of controlling same, and the program according to one embodiment of the present invention, an object to be controlled is an image forming apparatus that emits a beam corresponding to an image onto an image-projected object to allow the image to be formed on the image-projected object, the image forming apparatus including: a lamp configured to serve as a light source for the beam emitted onto the image-projected object; and a lamp power supply configured to drive the lamp. The image forming apparatus further including a lens configured to focus the beam emitted from the lamp upon the image-projected object; a brightness sensor configured to measure brightness of direct or indirect light in a light path from the lamp to the lens, as a lamp brightness; and a memory configured to store, as a reference brightness value, a the lamp brightness measured by the brightness sensor at a first time when brightness of the beam on the image-projected object has reached a target value. In the image forming apparatus, at the second time later than the first time, a) an output power of the lamp power supply is varied and the lamp brightness measured by the brightness sensor for respective levels of the output power of the lamp power supply are obtained, b) correspondence information that indicates a correspondence between a change in the output power of the lamp power supply and a change in the lamp brightness at the second time is generated or updated based on the values obtained, and c) the generated or updated correspondence information is stored in the memory. At a third time later than the second time, the reference brightness value and the correspondence information are loaded from the memory, a level of the output power of the lamp power supply corresponding to the reference brightness value is identified based on the correspondence information, and the lamp power supply is driven with the identified level of the output power.

As described above, according to the present invention, the brightness on the image-projected object can be adjusted. In particular, the present invention makes it possible to achieve "daily operations with little need for human labor" and "time- and trouble-saving, simple and accurate adjustment" in connection with such adjustment.

BRIEF DESCRIPTION OF THE DRAWINGS

FIG. 4 shows specific examples of results of the lamp power/brightness value correspondence calibration process as shown in FIG. 3;

DETAILED DESCRIPTION OF THE PREFERRED EMBODIMENTS

Hereinafter, an embodiment of the present invention will be described. Correspondence between the constituent features of the present invention as recited in the appended claims and specific examples described in the present specification and the accompanying drawings is exemplified as follows. Note that this preliminary description is meant to confirm that specific examples that support the present invention recited in the appended claims are described in the specification and the accompanying drawings. Therefore, even if there is a specific example that is described in the specification or the accompanying drawings but which is not described in this preliminary description as corresponding to any constituent feature of the present invention, that does not mean that this specific example does not correspond to any constituent feature. Conversely, even if a certain specific example is described in this preliminary description as corresponding to a certain constituent feature of the present invention, that does not mean that the certain specific example does not correspond to any other constituent feature.

Moreover, this preliminary description should not be interpreted as meaning that all inventive features that have their specific examples described in the specification or the accompanying drawings are recited in the appended claims. In other words, this preliminary description should not be interpreted as negating any inventive feature that has its specific example described in the specification or the accompanying drawings but is not recited in the appended claims of the present application, i.e., any inventive feature that may be claimed in a divisional application or additionally claimed in the present application by amendment in the future.

Figure 1:
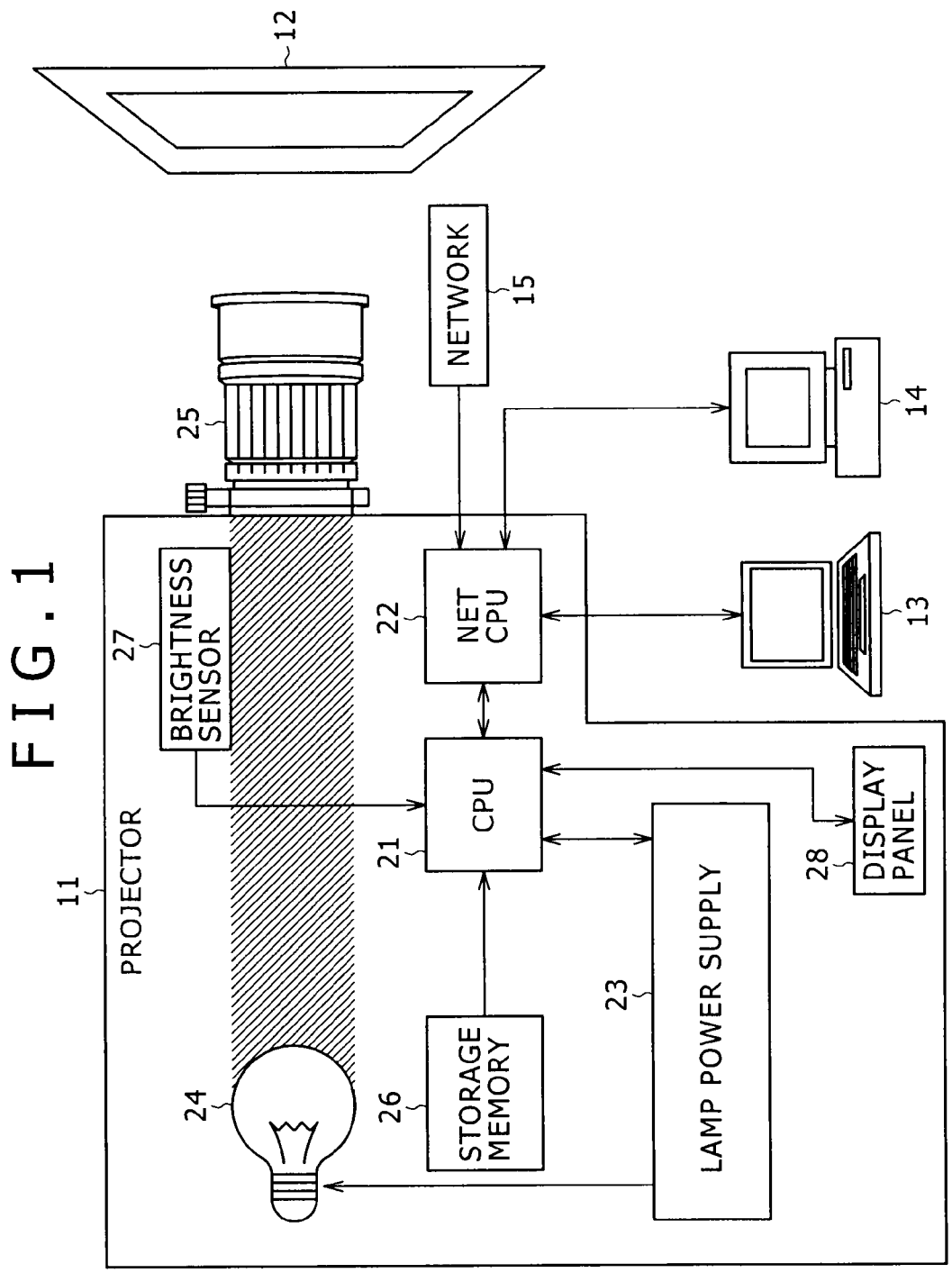
FIG. 1 shows an exemplary structure of an information processing system according to one embodiment of the present invention.
Figure 2:
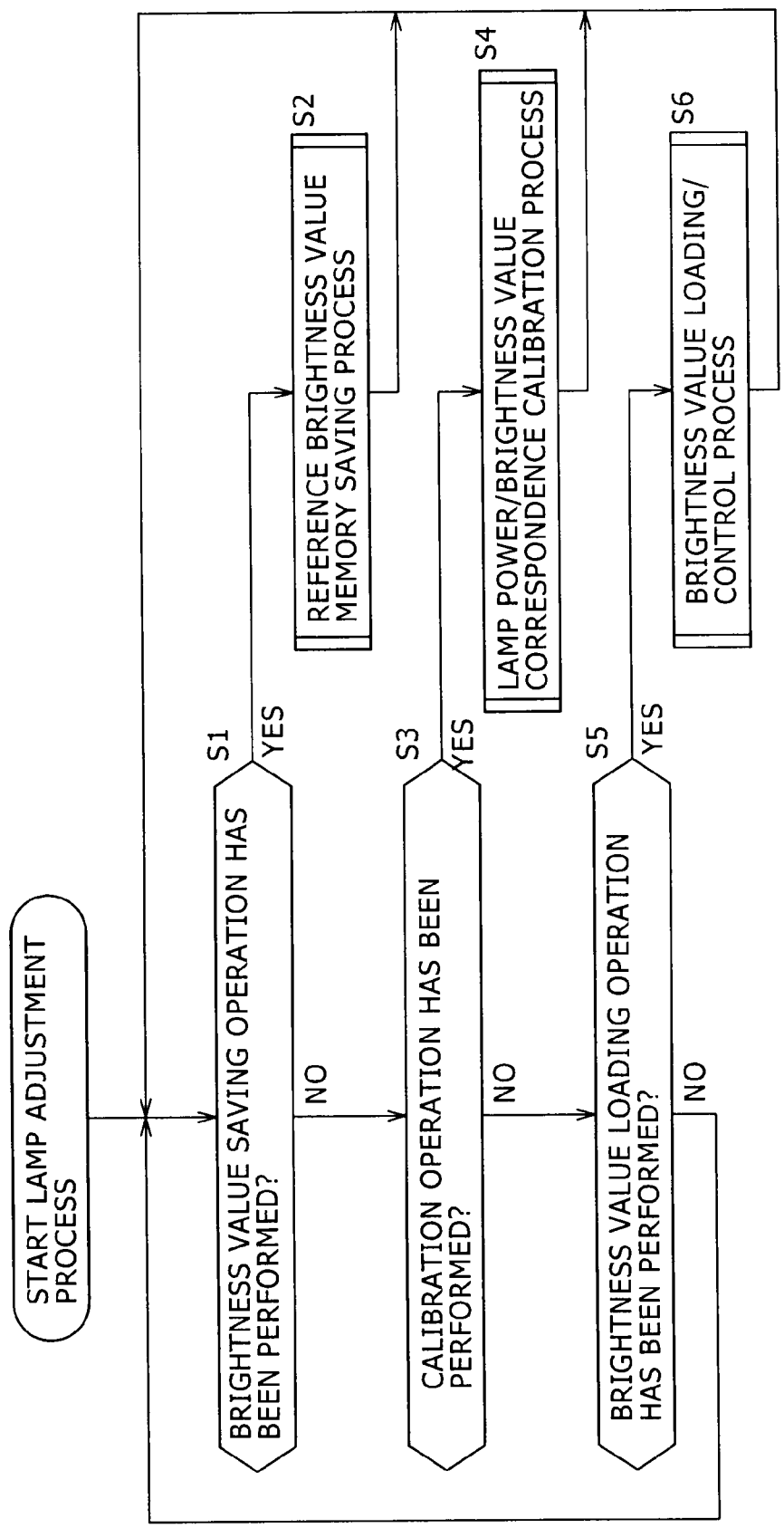
FIG. 2 is a flowchart illustrating an exemplary lamp adjustment process performed by a projector in the information processing system as shown in FIG. 1.
Figure 3:
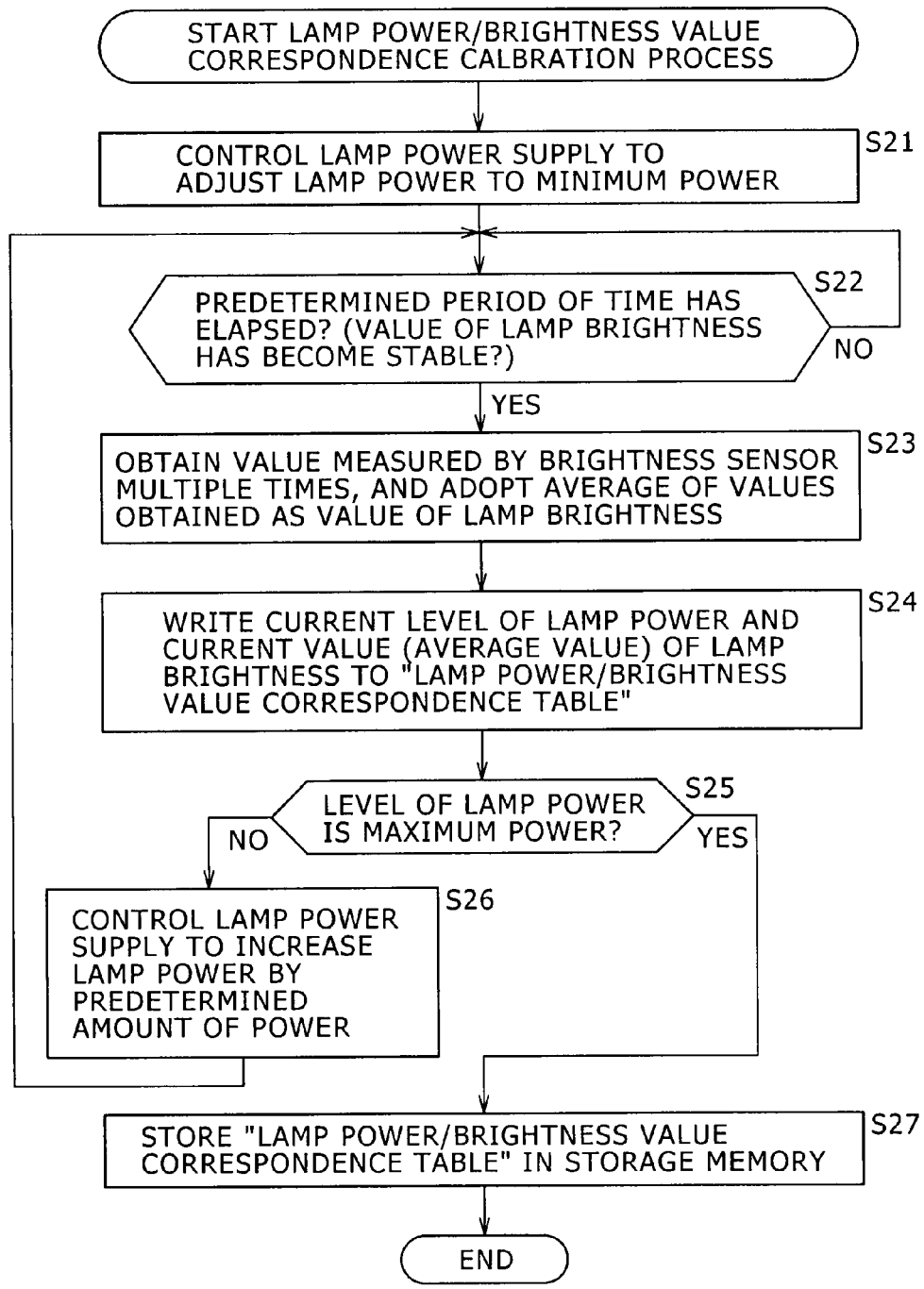
FIG. 3 is a flowchart illustrating an exemplary lamp power/brightness value correspondence calibration process within the lamp adjustment process as shown in FIG. 2.
Figure 5:
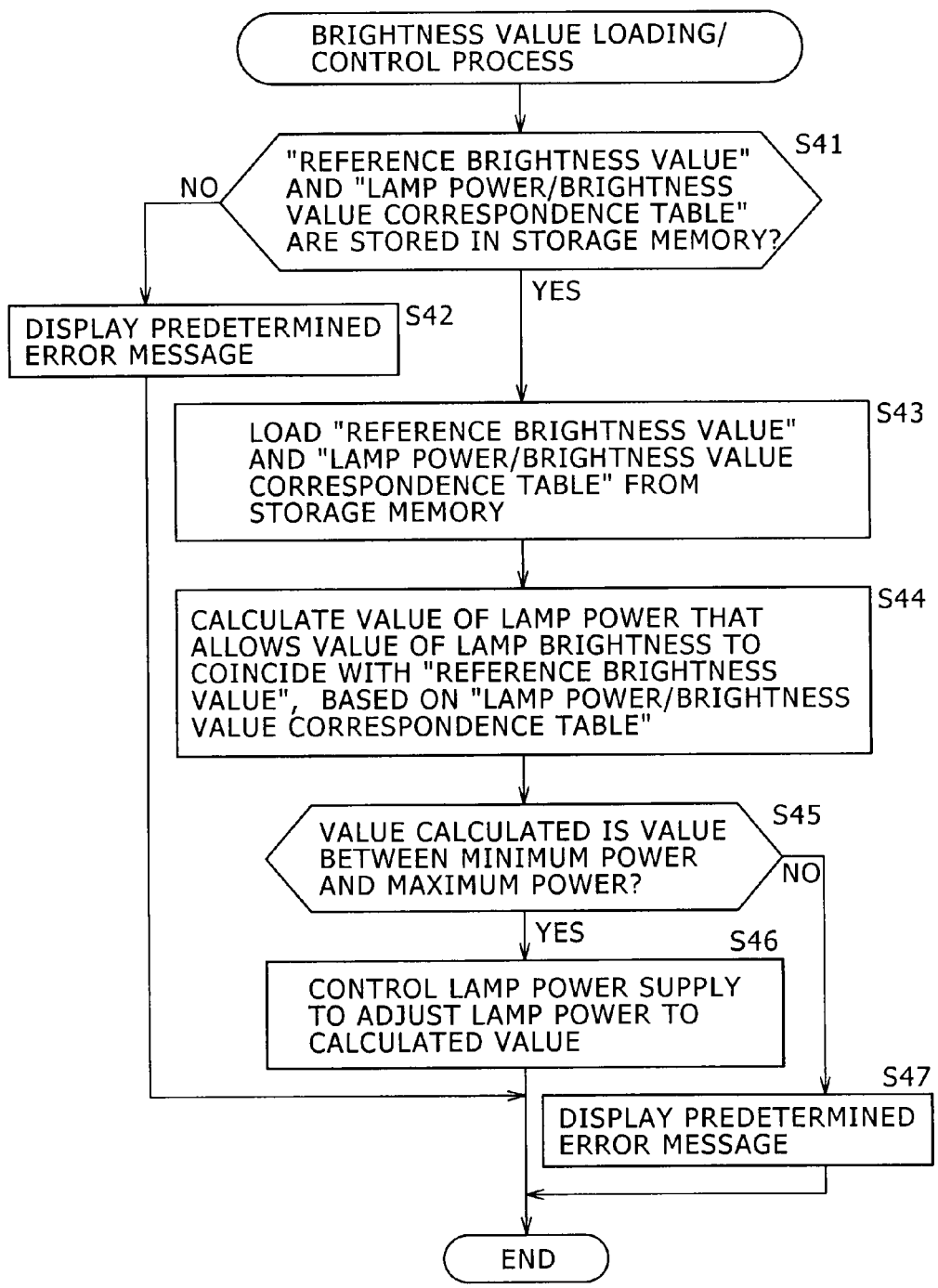
FIG. 5 is a flowchart illustrating an exemplary brightness value loading/control process within the lamp adjustment process as shown in FIG. 2.

An image forming apparatus according to one embodiment of the present invention is an image forming apparatus (e.g., a projector 11 as shown in FIG. 1) that emits a beam corresponding to an image onto an image-projected object (e.g., a screen 12 as shown in FIG. 1) to allow the image to be formed on the image-projected object, the apparatus including: a lamp (e.g., a lamp 24 as shown in FIG. 1) configured to serve as a light source for the beam emitted onto the image-projected object; a lamp power supply (e.g., a lamp power supply 23 as shown in FIG. 1) configured to drive the lamp; a lens (e.g., a lens 25 as shown in FIG. 1) configured to focus the beam emitted from the lamp upon the image-projected object; a brightness sensor (e.g., a brightness sensor 27 as shown in FIG. 1) configured to measure brightness of direct or indirect light in a light path from the lamp to the lens, as a lamp brightness; a memory (e.g., a storage memory 26 as shown in FIG. 1) configured to store, as a reference brightness value, a value of the lamp brightness measured by the brightness sensor at a first time when brightness of the beam on the image-projected object has reached a target value; and a control circuit (e.g., a CPU 21 as shown in FIG. 1) configured to control the image forming apparatus, wherein at a second time later than the first time, the control circuit performs first control of a) varying an output power of the lamp power supply and obtaining values of the lamp brightness measured by the brightness sensor for respective levels of the output power, b) generating or updating correspondence information that indicates a correspondence between a change in the output power of the lamp power supply and a change in the value of the lamp brightness at the second time, based on the values obtained, and c) storing the generated or updated correspondence information in the memory (e.g., a "lamp power/brightness value correspondence calibration process" at step S4 as shown in FIG. 2, which is performed in accordance with a flowchart of FIG. 3), and at a third time later than the second time, the control circuit performs second control of loading the reference brightness value and the correspondence information from the memory, identifying a level of the output power of the lamp power supply corresponding to the reference brightness value based on the correspondence information, and driving the lamp power supply with the identified level of the output power (e.g., a "brightness value loading/control process" at step S6 as shown in FIG. 2, which is performed in accordance with a flowchart of FIG. 5).

The image forming apparatus may further include a reception circuit (e.g., a NET CPU 22 as shown in FIG. 1) configured to receive a command issued from the image forming apparatus itself or an external device, wherein the control circuit further performs control in accordance with the command received by the reception circuit.

If a save command for causing the reference brightness value to be stored in the memory is issued and received by the reception circuit at the first time (e.g., if the result of the determination at step S1 as shown in FIG. 2 is "YES"), the control circuit may perform third control of obtaining the value of the lamp brightness measured by the brightness sensor and storing the value obtained in the memory as the reference brightness value (e.g., perform a "reference brightness value memory saving process" at step S2 as shown in FIG. 2 in accordance with the flowchart of FIG. 5).

If a calibration command for generating or updating the correspondence information is issued and received by the reception circuit at the second time (e.g., if the result of the determination at step S3 as shown in FIG. 2 is "YES"), the control circuit may perform the first control.

When the control circuit has changed the output power of the lamp power supply from a first level to a second level during the first control, the control circuit may obtain the lamp brightness corresponding to the second level of the output power from the brightness sensor after a predetermined period of time has elapsed since the change in the output power of the lamp power supply (e.g., perform a process of step S23 after the result of the determination at step S22 as shown in FIG. 3 becomes "YES").

The control circuit may obtain a plurality of values of the lamp brightness measured by the brightness sensor for the second level of the output power, perform a predetermined operation using the plurality of values, and obtain a value obtained by the predetermined operation as the lamp brightness corresponding to the second level of the output power (e.g., perform processes of steps S23 and S24 as shown in FIG. 3).

If a load command for causing the reference brightness value and the correspondence information to be loaded from the memory is issued and received by the reception circuit at the third time (e.g., if the result of the determination at step S5 as shown in FIG. 2 is "YES"), the control circuit may perform the second control.

A method of controlling an image forming apparatus according to one embodiment of the present invention is a method of controlling an apparatus corresponding to the above-described image forming apparatus according to one embodiment of the present invention.

Figure 7:
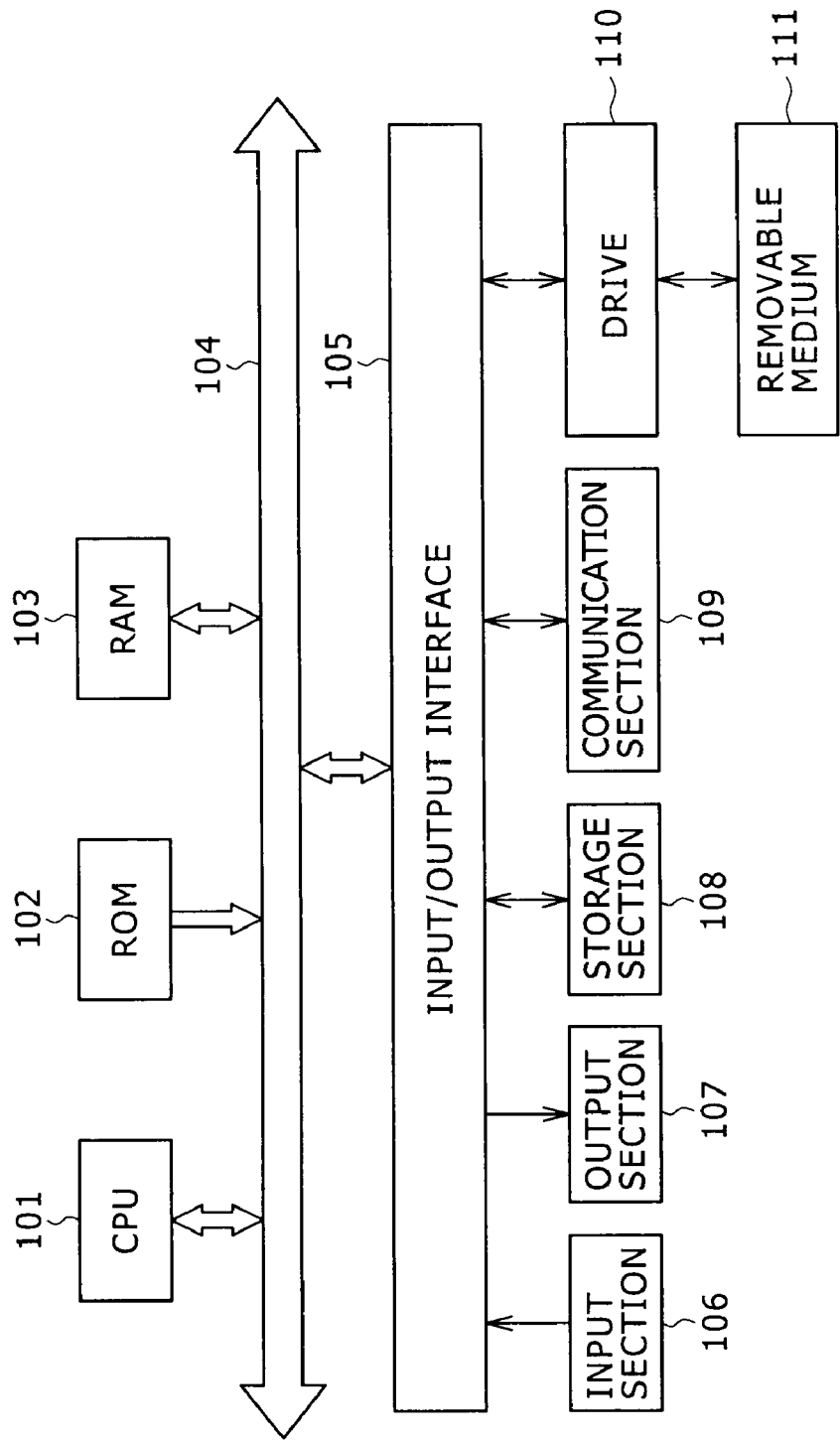
FIG. 7 is a block diagram illustrating an exemplary structure of personal computers as shown in FIG. 1.

A program according to one embodiment of the present invention is a program to be executed by a computer that controls the above-described image forming apparatus according to one embodiment of the present invention, e.g., a personal computer having a structure as shown in FIG. 7.

Hereinafter, an embodiment of the present invention will be described with reference to the accompanying drawings.

FIG. 1 shows an exemplary structure of an information processing system according to one embodiment of the present invention which is applied to the field of digital cinema.

The information processing system as shown in FIG. 1 includes a projector 11, a screen 12, and personal computers 13 and 14.

The projector 11 projects a video content, such as a movie, on the screen 12. More specifically, the projector 11 emits beams corresponding to the video content onto the screen 12, thereby forming a video component of the video content on the screen 12.

Note that an object on which an image is formed as a result of the projector 11 emitting the beam thereonto is not limited to the screen 12. This object will be hereinafter referred to as an "image-projected object". Another example of the image-projected object is a white wall or the like.

The projector 11 has a function of varying a lamp output (hereinafter referred to as a "lamp adjustment function"). In the information processing system as shown in FIG. 1, the personal computers 13 and 14 are provided to externally control this function. The devices that control this function are not limited to the personal computers 13 and 14, but other types of devices may be used instead. The number of such devices is not limited to two as in the example of FIG. 1.

In the present embodiment, for example, the personal computer 13 or 14 issues various commands to the projector 11 in order to accomplish the lamp adjustment function. Specific examples of the commands will be described later with reference to FIGS. 2, 3, 4, 5, 6, and 7.

Under control of the personal computer 13 or 14, the projector 11 accomplishes the lamp adjustment function. An exemplary manner in which the lamp adjustment function is accomplished will be described later with reference to FIGS. 2 to 7.

In order to accomplish the lamp adjustment function, the projector 11 as shown in FIG. 1 is provided with a central processing unit (CPU) 21, a NET CPU 22, a lamp power supply 23, a lamp 24, a lens 25, a storage memory 26, a brightness sensor 27, and a display panel 28.

The CPU 21 performs various processes in accordance with a program stored in the storage memory 26, a read only memory (ROM) (not shown), or the like. Specific examples of data stored in the storage memory 26 and the processes performed by the CPU 21 will be described later with reference to FIGS. 2 to 7.

The NET CPU 22 performs various processes required to perform serial communication with the personal computer 13 or communicate with the personal computer 14 via Ethernet (registered brand). In addition, the NET CPU 22 is connected to a network 15 such as the Internet, and performs various processes required to communicate with an external device (not shown) connected to the network 15. Specifically, when the various commands for accomplishing the lamp adjustment function have been issued from the personal computer 13 or 14, the NET CPU 22 receives those commands and provides them to the CPU 21, for example.

In the present embodiment, the CPU 21 and the NET CPU 22 are independent of each other. Note, however, that the CPU 21 and the NET CPU 22 may be integrated into one unit. In other words, the communication capabilities of the NET CPU 22 may be transferred to the CPU 21.

Note that the devices that externally control the lamp adjustment function are not limited to the personal computer 13 and 14, as long as they are capable of communicating with the NET CPU 22. Because this communication with the NET CPU 22 may involve intermediacy of the network 15, the external device connected to the network 15 can also be adopted as a device for externally controlling the lamp adjustment function.

Under control of the CPU 21, the lamp power supply 23 supplies power to the lamp 24. The lamp 24 is a light source for the beams corresponding to the video content. Therefore, the brightness on the screen 12 can be adjusted by adjusting the beams. In this case, the beams from the lamp 24 can be adjusted by an output (i.e., the power supplied) from the lamp power supply 23 to the lamp 24, for example. The output from the lamp power supply 23, i.e., the power supplied from the lamp power supply 23 to the lamp 24, will be hereinafter referred to as a "lamp power". In the present embodiment, for example, the lamp power can be adjusted in percentage terms, with a maximum rated output of the lamp power supply 23 being expressed as 100%. The CPU 21 determines a level of the lamp power that allows the brightness on the screen 12 to be kept at the reference brightness value. Then, the CPU 21 controls the lamp power supply 23 to output that level of lamp power, thereby adjusting the beam emitted from the lamp 24.

The beam thus adjusted is emitted from the lamp 24 onto the screen 12 through the lens 25. Thus, the brightness on the screen 12 is kept at the reference brightness value.

Under control of the CPU 21, the storage memory 26 stores various types of information. The brightness sensor 27 is contained in the projector 11, and measures brightness of a direct or indirect light in a light path from the lamp 24 to the lens 25, and provides a measured value of the brightness to the CPU 21. Specific examples of the data stored in the storage memory 26 and how the value (brightness value) measured by the brightness sensor 27 is used will be described later with reference to FIGS. 2 to 7.

Under control of the CPU 21, the display panel 28 displays various types of information.

Next, the lamp adjustment function will now be described below with reference to FIGS. 2 to 7 as necessary.

A series of processes performed by the projector 11 to accomplish the lamp adjustment function will be collectively referred to as a "lamp adjustment process". An outline of the lamp adjustment process is as follows.

As noted previously, the information processing system as shown in FIG. 1 according to the present embodiment is applied to the field of the digital cinema. In the field of the digital cinema, an organization called Digital Cinema Initiatives (DCI) defined a specification called DCI Spec. This specification stipulates that "a peak white luminance at a screen center should be 48 cd/m² (14 ft-L)" as a video parameter to be referred to. This means that a level of brightness that is produced by approximately 48 candles per square meter is needed at the screen center. That is, the reference brightness value as defined by the DCI Spec corresponds to the level of brightness produced by approximately 48 candles per square meter. It is necessary to keep the brightness on the screen 12 at the reference brightness value defined by the DCI Spec at all times.

However, by its nature, the lamp 24 deteriorates the longer it is used. That is, even if the level of the lamp power supplied to the lamp 24 is the same, the brightness of the lamp 24 (i.e., the brightness of the beam therefrom) decreases the longer the lamp 24 has been used. Therefore, if the same level of lamp power as at the start of the use of the lamp 24 were supplied to the lamp 24 when the lamp 24 has been used for a long time, the brightness on the screen 12 would be lower than at the start of the use of the lamp 24. In other words, the brightness on the screen 12 cannot be kept at the reference brightness value as defined by the DCI Spec.

Therefore, it is necessary to adjust the lamp power supplied to the lamp 24 in accordance with the degree of deterioration of the lamp 24, in order to keep the brightness on the screen 12 at the reference brightness value as defined by the DCI Spec at all times.

This adjustment may be accomplished by a existing method. That is, the projector 11 may determine an appropriate level of the lamp power while a user measures the brightness on the screen 12 using a measuring instrument. This method of adjustment, however, is inefficient, involving the need for the user to carry out a very cumbersome operation.

As such, in the present embodiment, instead of the brightness on the screen 12, a quantity that has a specific relationship with the brightness on the screen 12 is used to determine the appropriate level of the lamp power. Specifically, brightness of the lamp 24 within the projector 11 is used to determine the appropriate level of the lamp power. More precisely, the brightness of the direct or indirect light in the light path from the lamp 24 to the lens 25 is used to determine the appropriate level of the lamp power. Hereinafter, this brightness will be referred to as "lamp brightness".

The projector 11 records, as a "reference brightness value", a value of the lamp brightness at the start of the use of the lamp 24, when the brightness on the screen 12 is at the reference brightness value as defined by the DCI Spec. When the lamp 24 has deteriorated as a result of a continued use, the projector 11 performs a calibration process regularly using a current value of the lamp brightness. Then, the projector 11 adjusts the lamp power for the lamp 24 using the "reference brightness value" and a result of the calibration process. Such a series of processes forms the outline of the lamp adjustment process.

This lamp adjustment process allows the brightness on the screen 12 to be kept at the reference brightness value as defined by the DCI Spec at all times, regardless of how far the deterioration of the lamp has progressed. Further, in the calibration process, the value of the lamp brightness, i.e., the value measured by the brightness sensor 27 within the projector 11, is used. Therefore, it is not necessary for the user to measure the brightness on the screen 12 using the measuring instrument as in the case of the existing method. In other words, the need for the cumbersome and costly operation is eliminated.

Details of the lamp adjustment process will now be described below.

Only at the time of initial adjustment, e.g., only at the start of the use of the lamp 24, the user measures the brightness on the screen 12 using the measuring instrument as in the existing method, and adjusts the lamp power so that the value of the brightness on the screen 12 as measured will coincide with the reference brightness value as defined by the DCI Spec.

More specifically, for example, at the time of the initial adjustment, the user operates the personal computer 13 or 14 (hereinafter referred to as "the personal computer 13 or the like") to issue a command for selecting a desired level of the lamp power to the projector 11. This command will be hereinafter referred to as a "lamp output level selection command". As a result, the projector 11 determines the level (expressed in percentage terms) specified by the lamp output level selection command to be the appropriate level of the lamp power. As a result, a light with a brightness corresponding to the level of the lamp power thus determined is emitted from the projector 11 and impinges on the screen 12. The user measures the brightness of the light that has impinged on the screen 12 using the measuring instrument, and checks whether the measured value of the brightness coincides with the reference brightness value as defined by the DCI Spec. The user repeats such a series of operations until the value measured by the measuring instrument, i.e., the value of the brightness on the screen 12, coincides with the reference brightness value as defined by the DCI Spec.

Then, when a current value of the brightness on the screen 12 coincides with the reference brightness value as defined by the DCI Spec, the user operates the personal computer 13 or the like to allow the projector 11 to store the value of the lamp brightness at the time, i.e., the value measured at the time by the brightness sensor 27 within the projector 11, as the "reference brightness value" for the lamp brightness. Hereinafter, this user operation will be referred to as a "brightness value saving operation".

The brightness value saving operation is not limited to any particular operations. In the present embodiment, it is assumed that an operation of instructing the personal computer 13 or the like to issue a predetermined command is adopted as the brightness value saving operation, for example. Hereinafter, this predetermined command will be referred to as a "reference brightness value saving command".

Upon receipt of the reference brightness value saving command via the NET CPU 22, the CPU 21 of the projector 11 obtains a current value measured by the brightness sensor 27 a plurality of times, and stores, for example, an average of those current values in the storage memory 26 as the "reference brightness value". Hereinafter, such a series of processes performed by the CPU 21 will be referred to as a "reference brightness value memory saving process".

Contents of the above explanation will now be described again, with reference to a flowchart of FIG. 2.

At step S1, the CPU 21 determines whether the brightness value saving operation has been performed.

If the result of the determination at step S1 is "NO", control proceeds to step S3. Unless the reference brightness value saving command is issued from the personal computer 13 or the like, the result of the determination at step S1 continues to be "NO". Processes at step S3 and later will be described later.

Meanwhile, if the reference brightness value saving command is issued from the personal computer 13 or the like, the result of the determination at step S1 becomes "YES", and control proceeds to step S2. At step S2, the "reference brightness value memory saving process" as described above is performed. When the "reference brightness value memory saving process" at step S2 has been completed, i.e., when the "reference brightness value" has been stored in the storage memory 26, control returns to step S1.

In the above-described manner, the value of the lamp brightness at the start of the use of the lamp 24, when the brightness on the screen 12 is at the reference brightness value as defined by the DCI Spec, is stored in the storage memory 26 as the "reference brightness value".

After a continued use, the lamp 24 will deteriorate. If this happens, the value of the lamp brightness cannot be kept at the "reference brightness value" even if the same level of lamp power is supplied to the lamp 24. In other words, the brightness on the screen 12 cannot be kept at the reference brightness value as defined by the DCI Spec. Accordingly, the calibration of the lamp power is needed to keep the value of the lamp brightness at the "reference brightness value" despite the current deteriorated state of the lamp 24. As the calibration process for the lamp power, the CPU 21 performs the following series of processes: a) varying the lamp power and obtaining values of the lamp brightness, i.e., values measured by the brightness sensor 27, for respective levels of the lamp power, and b) identifying a correspondence between a change in the lamp power and a change in the value of the lamp brightness. Hereinafter, the calibration process composed of the above series of processes will be referred to as a "lamp power/brightness value correspondence calibration process".

Notice here that the values measured by the brightness sensor 27 are used in the "lamp power/brightness value correspondence calibration process", and that therefore the user does not need to measure the brightness on the screen 12 using the measuring instrument as in the existing method. That is, the only operation that the user needs to perform is to operate the personal computer 13 or the like to perform an operation for initiating the "lamp power/brightness value correspondence calibration process". Hereinafter, this operation to be performed by the user will be referred to as a "calibration operation".

The calibration operation is not limited to any particular operations. In the present embodiment, it is assumed that an operation for causing the personal computer 13 or the like to issue a predetermined command is adopted as the calibration operation, for example. Hereinafter, this predetermined command will be referred to as a "calibration command".

Contents of the above explanation will now be described again, with reference to the flowchart of FIG. 2.

At step S3, the CPU 21 determines whether the calibration operation has been performed.

If the result of the determination at step S3 is "NO", control proceeds to step S5. Unless the calibration command is issued from the personal computer 13 or the like, the result of the determination at step S3 continues to be "NO". Processes at step S5 and later will be described later.

Meanwhile, if the calibration command is issued from the personal computer 13 or the like, the result of the determination at step S3 becomes "YES", and control proceeds to step S4. At step S4, the "lamp power/brightness value correspondence calibration process" is performed. When the "lamp power/brightness value correspondence calibration process" at step S4 has been completed, control returns to step S1 and the process is repeated.

Here, details of the "lamp power/brightness value correspondence calibration process" at step S4 will now be described below.

For example, suppose that the lamp 24 has deteriorated after a continued use, and that the user accordingly desires to perform the calibration in order to, despite the current deteriorated state of the lamp 24, allow the lamp 24 to emit the light while keeping the value of the lamp brightness at the "reference brightness value" as stored when the brightness value saving operation was performed, i.e., in order to allow the brightness on the screen 12 to be kept at the reference brightness value as defined by the DCI Spec. In this case, as described above, the user only needs to perform the calibration operation using the personal computer 13 or the like. Note that an operation for instructing the lamp 24 to emit the light after the calibration corresponds to a "brightness value loading operation" at step S5, which will be described later.

After accepting the calibration operation, the projector 11 varies the lamp power in stages, from a minimum level toward a maximum level of a rated input of the lamp 24, for example, and obtains values of the lamp brightness, i.e., values measured by the brightness sensor 27, for respective levels of the lamp power. Then, based on the values obtained, the projector 11 generates or updates correspondence information that indicates the correspondence between the change in the lamp power and the change in the value of the lamp brightness, and stores the generated or updated correspondence information in the storage memory 26. The above process is the "lamp power/brightness value correspondence calibration process".

The correspondence between the lamp power and the brightness value refers to, for example, a correspondence between a lamp power of X % and a value Y of the lamp brightness, when the output of the lamp power and the value of the lamp brightness are X % and Y, respectively, with the current deteriorated state of the lamp 24. The format of the correspondence information stored in the storage memory 26 is not limited to any particular formats. In the present embodiment, it is assumed that the format of the correspondence information is a table format, for example. Accordingly, the correspondence information according to the present embodiment will be hereinafter referred to as a "lamp power/brightness value correspondence table". A specific example of the "lamp power/brightness value correspondence table" will be described later with reference to FIG. 4.

More specifically, the "lamp power/brightness value correspondence calibration process" is performed in accordance with a flowchart of FIG. 3, for example.

At step S21, the CPU 21 controls the lamp power supply 23 to adjust the lamp power to a minimum power.

Here, the "minimum power" refers to a minimum wattage of an input rating of the lamp 24. Therefore, the lamp power of the lamp power supply 23 as a result of the control at step S21, i.e., the power to be supplied to the lamp 24 as a result of the control at step S21, may differ depending on the rating of the lamp 24. Likewise, a maximum wattage of the input rating of the lamp 24 will be hereinafter referred to as a "maximum power".

At step S22, the CPU 21 determines whether a predetermined period of time has elapsed.

If it is determined at step S22 that the predetermined period of time has not elapsed, control returns to step S22, and the determination process of step S22 is repeated. In other words, the determination process of step S22 is repeated until the predetermined period of time elapses, whereby the "lamp power/brightness value correspondence calibration process" is suspended.

The aim of the process of step S22 is, as noted within brackets in FIG. 3, to suspend the "lamp power/brightness value correspondence calibration process" until the brightness of the lamp 24 becomes steady, i.e., until the value of the lamp brightness becomes stable. When a change has been made in the lamp power to be supplied from the lamp power supply 23 to the lamp 24, the brightness of the lamp 24 does not exhibit a corresponding change immediately, but only after a certain delay. In other words, a certain period of time has to elapse before the value of the lamp brightness becomes stable. As such, in order to obtain a reliable value of the lamp brightness, the determination process of step S22 is repeated until the value of the lamp brightness becomes stable. In other words, the "predetermined period of time" in step S22 is not limited to any particular periods of time as long as it is equal to or longer than the period of time required for the value of the lamp brightness to become stable. In the present embodiment, it is assumed that a period of 30 seconds is adopted as the "predetermined period of time", for example.

After the predetermined period of time elapses, the result of the determination at step S22 becomes "YES", and control proceeds to step S23.

At step S23, the CPU 21 obtains the value measured by the brightness sensor 27 multiple times, and adopts the average of the values obtained as the value of the lamp brightness.

The reason why, instead of a single value measured by the brightness sensor 27, the average of the multiple values measured by the brightness sensor 27 is adopted as the value of the lamp brightness is that it is thus possible to reduce influence of a flicker of the lamp 24 and variations in the multiple values obtained. As long as the reduction in the influence of the flicker and the variations is accomplished, no particular restrictions are placed on the number of times the value measured by the brightness sensor 27 is obtained or timing of obtaining the values. In the present embodiment, it is assumed that the value measured by the brightness sensor 27 is obtained 30 times, at intervals of 100 ms, for example.

At step S24, the CPU 21 writes a current level of the lamp power and a current value of the lamp brightness (i.e., the average value) to the "lamp power/brightness value correspondence table".

Note that the format of the "lamp power/brightness value correspondence table" at the time of the process of step S24 does not need to coincide with the format of the "lamp power/brightness value correspondence table" at the time of a process of step S27 described later, where the "lamp power/brightness value correspondence table" is finally stored in the storage memory 26. Also note that a location to which the current level of the lamp power and the current value of the lamp brightness are written in the process of step S24 does not need to be the storage memory 26, but may be a RAM (not shown) or the like, for example. In short, at the time of the process of step S24, the current level of the lamp power and the current value of the lamp brightness (i.e., the average value) may be stored at any location as long as they are in a state capable of being read at the time of the process of step S27.

In the present embodiment, it is assumed that the value measured by the brightness sensor 27, i.e., the value of the lamp brightness, is expressed in 10 bits, for example. In addition, it is assumed that a table as shown in the upper portion of FIG. 4 is adopted as the format of the "lamp power/brightness value correspondence table" at the time of the process of step S24. Specifically, in the case where the minimum power in the process of step S21 is 50% and the value (i.e., the average value) adopted as the value of the lamp brightness in the process of step S23 is 500, for example, "50%" and "500" are written as the current level of the lamp power and the current value (average value) of the lamp brightness, respectively, as shown in a second row of the table as shown in the upper portion of FIG. 4.

At step S25, the CPU 21 determines whether the level of the lamp power is the maximum power.

If it is determined at step S25 that the level of the lamp power is not the maximum power, control proceeds to step S26.

At step S26, the CPU 21 controls the lamp power supply 23 to increase the lamp power by a predetermined amount of power.

Note that the amount of power by which the lamp power is caused to increase by the process of step S26 is not limited to any particular amounts. In the present embodiment, it is assumed that this amount is 10%, for example. Specifically, in the case where the current level of the lamp power at the process of step S24 is the minimum power, i.e., 50%, for example, the lamp power supply 23 is controlled to supply a lamp power of 60%.

Thereafter, control returns to step S22. Specifically, suppose that the maximum power is 100% and that the lamp power is caused to increase by 10% in each iteration of the process of step S26, for example. In this case, as shown in the table in the upper portion of FIG. 4, values of the lamp brightness when the level of the lamp power is 50%, 60%, 70%, 80%, 90%, and 100%, respectively, are written to the "lamp power/brightness value correspondence table" sequentially.

After the process of step S24 is completed when the current level of the lamp power is 100%, the result of the determination at step S25 becomes "YES", and control proceeds to step S27.

At step S27, the CPU 21 stores the "lamp power/brightness value correspondence table" to which all the data has been written in the storage memory 26.

Note that, as noted previously, the format of the "lamp power/brightness value correspondence table" as stored in the storage memory 26 is not limited to any particular formats. For example, the "lamp power/brightness value correspondence table" may be stored in the storage memory 26 in the table format as shown in the upper portion of FIG. 4. In the case where the "lamp power/brightness value correspondence table" is stored in the storage memory 26 in the table format as shown in the upper portion of FIG. 4, the values of the lamp brightness included in the "lamp power/brightness value correspondence table" are only the values (average values) of the lamp brightness, as measured by the brightness sensor 27, corresponding to the lamp powers of 50%, 60%, 70%, 80%, 90%, and 100%.

Alternatively, the "lamp power/brightness value correspondence table" may be stored in the storage memory 26 in a format as shown in the lower portion of FIG. 4. In this case, the values of the lamp brightness included in the "lamp power/brightness value correspondence table" stored in the storage memory 26 include not only the values (average values) of the lamp brightness, as measured by the brightness sensor 27, corresponding to the lamp powers of 50%, 60%, 70%, 80%, 90%, and 100%, but also values of the lamp brightness obtained by linear interpolation for those measured values (average values).

Figure 6:
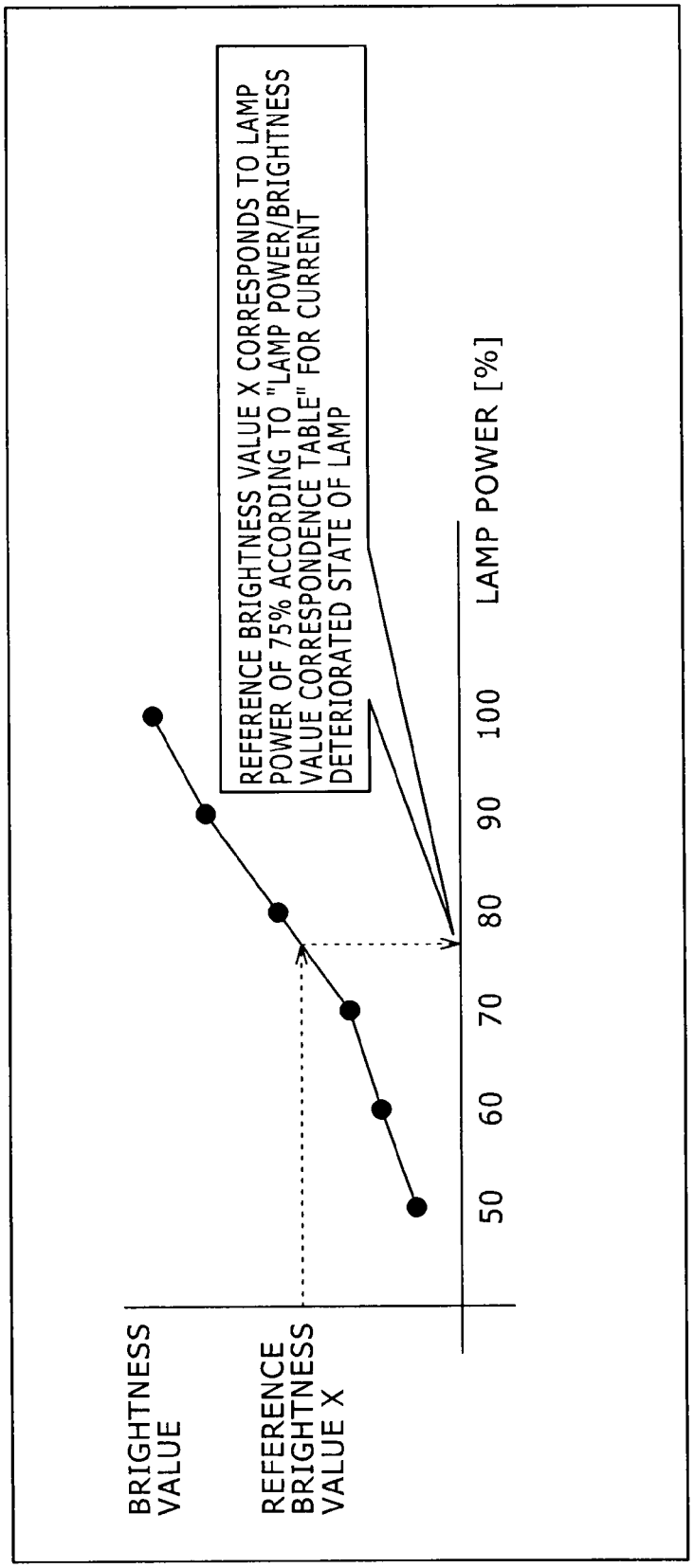
FIG. 6 shows a specific example of a result of the brightness value loading/control process as shown in FIG. 5.

This makes it possible to grasp, nearly accurately, a characteristic of the change in the value of the lamp brightness when the lamp power changes continuously from 50% to 100%, only by referring to the "lamp power/brightness value correspondence table". This contributes to increasing the precision with which the level of the lamp power corresponding to the "reference brightness value" is identified in a "brightness value loading/control process" as illustrated in FIGS. 5 and 6, which will be described later. That is, in the case of the format as shown in the upper portion of FIG. 4, the level of the lamp power corresponding to the "reference brightness value" can be identified only as one of discrete values in increments of 10%, i.e., 50%, 60%, 70%, 80%, 90%, and 100%. In contrast, in the case of the format as shown in the lower portion of FIG. 4, the level of the lamp power corresponding to the "reference brightness value" can be identified as a value at any point in a range of 50% to 100%.

When the "lamp power/brightness value correspondence table" has been stored in the storage memory 26, the "lamp power/brightness value correspondence calibration process" is completed. That is, the process of step S4 as shown in FIG. 2 is completed, and control returns to step S1 and the process is repeated.

In this stage, the storage memory 26 stores the "reference brightness value" and the "lamp power/brightness value correspondence table" corresponding to the current deteriorated state of the lamp 24.

Therefore, by loading the "reference brightness value" and the "lamp power/brightness value correspondence table" from the storage memory 26 and comparing them, the CPU 21 is able to identify the level of the lamp power required to keep the value of the lamp brightness at the "reference brightness value", i.e., to keep the brightness on the screen 12 at the reference brightness value as defined by the DCI Spec, with the current deteriorated state of the lamp 24. Then, by controlling the lamp power supply 23 to output the identified level of lamp power, the CPU 21 is able to keep, despite the current deteriorated state of the lamp 24, the value of the lamp brightness at the "reference brightness value", i.e., keep the brightness on the screen 12 at the reference brightness value as defined by the DCI Spec, as when the lamp 24 is in the initial state before deterioration. Hereinafter, the above series of processes performed by the CPU 21 will be referred to as the "brightness value loading/control process".

The "brightness value loading/control process" is started when the user has performed a predetermined operation. Hereinafter, this predetermined operation will be referred to as the "brightness value loading operation".

The brightness value loading operation is not limited to any particular operations. In the present embodiment, it is assumed that an operation for causing the personal computer 13 or the like to issue a predetermined command is adopted as the brightness value loading operation, for example. Hereinafter, this predetermined command will be referred to as a "brightness value loading command".

Contents of the above explanation will now be described again, with reference to the flowchart of FIG. 2.

At step S5, the CPU 21 determines whether the brightness value loading operation has been performed.

If the result of the determination at step S5 is "NO", control returns to step S1. Unless the brightness value loading command is issued from the personal computer 13 or the like, the result of the determination at step S5 continues to be "NO" and control returns to step S1 and the process is repeated.

Meanwhile, if the brightness value loading command is issued from the personal computer 13 or the like, the result of the determination at step S5 becomes "YES", and control proceeds to step S6. At step S6, the "brightness value loading/control process" is performed. After the "brightness value loading/control process" at step S6 is completed, control returns to step S1 and the process is repeated.

Here, details of the "brightness value loading/control process" at step S6 will now be described below.

For example, suppose that the user desires to allow the lamp 24 to emit the light while keeping the lamp brightness at the previously saved value, i.e., while keeping the value of the lamp brightness at the "reference brightness value". In this case, the user only needs to perform the brightness value loading operation using the personal computer 13 or the like, as described above.

After accepting the brightness value loading operation, the projector 11 loads the "reference brightness value" stored in the storage memory 26 as a result of the "reference brightness value memory saving process" at step S2. In addition, the projector 11 loads the "lamp power/brightness value correspondence table" stored in the storage memory 26 as a result of the "lamp power/brightness value correspondence calibration process" in the previous iteration of step S4. Then, the projector 11 refers to the loaded "reference brightness value" and "lamp power/brightness value correspondence table" to identify the level of the lamp power corresponding to the "reference brightness value", and controls the lamp power supply 23 to output the identified level of lamp power. The above series of processes corresponds to the "brightness value loading/control process".

More specifically, the "brightness value loading/control process" is performed in accordance with a flowchart of FIG. 5, for example.

At step S41, the CPU 21 determines whether the "reference brightness value" and the "lamp power/brightness value correspondence table" are stored in the storage memory 26.

When at least one of the "reference brightness value" and the "lamp power/brightness value correspondence table" is not stored in the storage memory 26, it is impossible to perform processes of step S43 and later, which will be described below. Accordingly, in that case, the CPU 21 makes a determination of "NO" in the process of step S41, and control proceeds to step S42. At step S42, the CPU 21 displays a predetermined error message. Then, the "brightness value loading/control process" is finished.

Note that the predetermined error message may be displayed on any location. For example, the predetermined error message may be displayed on the display panel 28 provided on the projector 11, or the personal computer 13 or the like, or both of them.

Also note that, in addition to displaying the predetermined error message, or without displaying the predetermined error message, the CPU 21 may control the lamp power supply 23 to adjust the lamp power to a default level.

Meanwhile, when both the "reference brightness value" and the "lamp power/brightness value correspondence table" are stored in the storage memory 26, the result of the determination at step S41 is "YES", and control proceeds to step S43.

At step S43, the CPU 21 loads the "reference brightness value" and the "lamp power/brightness value correspondence table" from the storage memory 26.

At step S44, based on the "lamp power/brightness value correspondence table", the CPU 21 calculates a value of the lamp power that allows the value of the lamp brightness to coincide with the "reference brightness value".

Specifically, suppose that the "lamp power/brightness value correspondence table" in the format as shown in the lower portion of FIG. 4 has been loaded from the storage memory 26, for example. That is, suppose that the "lamp power/brightness value correspondence table" corresponding to the current deteriorated state of the lamp 24, more accurately, the deteriorated state of the lamp 24 at the time when the "lamp power/brightness value correspondence calibration process" was performed in the previous iteration of step S4, is such as shown in the lower portion of FIG. 4. Also suppose that the "reference brightness value" loaded from the storage memory 26 is brightness value X as shown in FIG. 6. In this case, the value calculated at step S44 is 75% as shown in FIG. 6.

At step S45, the CPU 21 determines whether the value calculated at step S44 is a value between the minimum power and the maximum power.

In the example of FIG. 6, the calculated value, 75%, is a value between the minimum power, 50%, and the maximum power, 100%. Therefore, the result of the determination at step S45 is "YES", and control proceeds to step S46.

At step S46, the CPU 21 controls the lamp power supply 23 to adjust the lamp power to the calculated value, i.e., 75% in the example of FIG. 6. As a result, the "brightness value loading/control process" is completed. As a result of the control process at step S46, the value of the lamp brightness becomes the "reference brightness value", e.g., the brightness value X in the example of FIG. 6, and accordingly, the brightness on the screen 12 is kept at the reference brightness value as defined by the DCI Spec.

In the case where the value calculated at step S44 is lower than the minimum power or higher than the maximum power, the control process at step S46 cannot be accomplished. This is because the value of the lamp brightness cannot coincide with the "reference brightness value" even if the lamp power is adjusted to the minimum power or the maximum power. In other words, it is because the value of the lamp power that allows the value of the lamp brightness to coincide with the "reference brightness value" is out of a range of lamp power control. As such, in that case, the CPU 21 makes a determination of "NO" in the process of step S45, and displays a predetermined error message at step S47. Then, the "brightness value loading/control process" is finished.

Note that the predetermined error message may be displayed on any location. For example, the predetermined error message may be displayed on the display panel 28 provided on the projector 11, or the personal computer 13 or the like, or both of them.

Also note that, in addition to displaying the predetermined error message, or without displaying the predetermined error message, the CPU 21 may control the lamp power supply 23 to adjust the lamp power to the minimum power or the maximum power.

Alternatively, in addition to displaying the predetermined error message, or without displaying the predetermined error message, the CPU 21 may add or subtract a predetermined offset amount to or from the value calculated at step S44 so that the resulting value will be between the minimum power and the maximum power, and control the lamp power supply 23 to adjust the lamp power to the resulting value, i.e., the value obtained by adding or subtracting the predetermined offset amount to or from the value calculated at step S44.

Note that this offset amount can also be used in the process of step S46. That is, in the process of step S46, the CPU 21 may perform a process of controlling the lamp power supply 23 to adjust the lamp power to the value obtained by adding or subtracting the offset amount to or from the value calculated at step S44.

Also note that the offset amount may be specified by the user by operating the personal computer 14 or the like.

The details of the lamp adjustment process according to the present embodiment have been described above with reference to FIGS. 2 to 6.

As noted previously, each of the "brightness value saving operation", the "calibration operation", and the "brightness value loading operation" is not limited to any particular operations, as long as the CPU 21 is able to accomplish the determination processes at steps S1, S3, and S5.

In the case where the "brightness value loading/control process" at step S6 needs to be performed every time a power of the projector 11 is turned on, for example, the CPU 21 may be allowed to recognize an operation of turning on the power of the projector 11 as one of the "brightness value loading operations". In this case, when the power of the projector 11 has been turned on, the CPU 21 is able to make a determination of "YES" in the process of step S5, and perform the "brightness value loading/control process" at step S6.

As noted previously, one aim of the lamp adjustment process according to the present embodiment is to keep the brightness on the screen 12 at a predetermined level. This aim may also be accomplished by the following processes. That is, the CPU 21 acquires the "reference brightness value" stored in the storage memory 26 and the value measured by the brightness sensor 27 as a target value and a feedback value, respectively. Then, the CPU 21 performs feedback control constantly in order to eliminate a difference between the target value and the measured value. This series of processes also accomplishes the aim of keeping the brightness on the screen 12 at the predetermined level. That is, the brightness on the screen 12 is kept at the predetermined level when a stationary state, in which the value of the lamp brightness is stable, has been reached after the performance of the above feedback control process.

However, a state of transition before the value of the lamp brightness becomes stable involves the following problems.

That is, in the case where the above control is performed with a high gain for the sake of greater responsiveness, for example, an overshoot occurs so that a change in the lamp power occurs multiple times during projection. This leads to a problem of a harmful influence on a life of the lamp 24.

Meanwhile, in the case where the above control is performed with a low gain in order to prevent the overshoot, a so-called time constant of a whole control system becomes large, leading to a problem that it takes a long time for the value of the lamp brightness to become stable.

In order to solve both the problems, the adoption of the lamp adjustment process as described above with reference to FIGS. 2 to 6 is preferable to the adoption of the above-described feedback control process involving gain control or the like. This is because the lamp adjustment process is accomplished more easily and at a lower cost.

The lamp adjustment process as described above with reference to FIGS. 2 to 6 can solve both the problems above for the following reasons.

That is, the "lamp power/brightness value correspondence calibration process" at step S4 is performed independently of the "brightness value loading/control process" at step S6. Accordingly, the user is able to allow the "lamp power/brightness value correspondence calibration process" at step S4 to be performed only a desired number of times at desired times, i.e., only an appropriate number of times, so that the life of the lamp 24 may not be adversely affected. Thus, the problem of the harmful influence on the life of the lamp 24 is solved.

Further, the "lamp power/brightness value correspondence calibration process" at step S4 can be considered as a process of achieving "measurement using the brightness sensor 27" and a "calibration operation to be performed in advance of the brightness adjustment". Therefore, at the time of the brightness adjustment, i.e., at the time of the process of step S46 in the "brightness value loading/control process" at step S6, the appropriate level of the lamp power in accordance with the deteriorated state of the lamp can be calculated simply and easily. This eliminates the need to adopt the above-described feedback control process as the control process at the time of the brightness adjustment, i.e., as the control process at step S46 in the "brightness value loading/control process" at step S6. Adoption of open-loop control, in which the calculated value of the lamp power is simply provided, is sufficient. In the case where the open-loop control is adopted, the level of brightness corresponding to the "reference brightness value" is reproduced only after the aforementioned delay caused by the lamp 24. This delay, caused by the lamp 24, is slight compared to the delay caused by the whole feedback control system with a reduced gain. Therefore, the level of brightness corresponding to the "reference brightness value" can be reproduced quickly. That is, the problem that it takes a long time for the value of the lamp brightness to become stable can be solved.

In summary, by performing the lamp adjustment process according to the present embodiment, the projector 11 is able to achieve the following effects.

That is, in the case of film-based screening, it is necessary to measure the brightness on the screen 12 in each instance of screening in order to keep the value of the brightness on the screen 12 steady, and this measurement requires a great deal of labor and cost. In contrast, in the case of the lamp adjustment process according to the present embodiment, such a labor and cost are not necessary because the lamp brightness, i.e., the values measured by the brightness sensor 27 inside the projector 11, is used.

Moreover, as for the switch in the lamp power, the switch in the lamp power needs to be made only once, when the lamp power is adjusted to the target value that reproduces the target brightness value (i.e., the reference brightness value), since the result of the calibration in the "lamp power/brightness value correspondence calibration process" at step S4 or the like can be used. This prevents the change in the power from occurring multiple times during screening, which would be caused by the feedback control. In addition, the time required for the value of the lamp brightness to become stable is shorter than in the case of the feedback control. Thus, the harmful influence on the images projected on the screen 12 and the life of the lamp 24, which would be caused when the feedback control is adopted, can be eliminated.

So far, the exemplary lamp adjustment process according to the present embodiment has been described.

Those processes performed by the CPU 21 as shown in FIG. 1 in the lamp adjustment process may be performed by another device, such as a CPU 101 as shown in FIG. 7 provided in the personal computer 13 or 14 as shown in FIG. 1. In other words, the functions of the CPU 21 as shown in FIG. 1 may be transferred to the CPU 101 as shown in FIG. 7 or the like.

FIG. 7 shows an exemplary structure of the personal computers 13 and 14. Hereinafter, the personal computers 13 and 14 will be simply referred to collectively as a "personal computer" without being followed by the reference numerals, unless the personal computers 13 and 14 need to be differentiated.

In the personal computer as shown in FIG. 7, the CPU 101 performs various processes in accordance with a program stored in a ROM 102 or a program loaded from a storage section 108 into a random access memory (RAM) 103. Data required for the CPU 101 to perform the various processes, and so on, are also stored in the RAM 103 as appropriate.

The CPU 101, the ROM 102, and the RAM 103 are connected to one another via a bus 104. An input/output interface 105 is also connected to the bus 104.

To the input/output interface 105 are connected: an input section 106 formed by a keyboard, a mouse, and the like; an output section 107 formed by a display and the like; the storage section 108 formed by a hard disk or the like; and a communication section 109 formed by a modem, a terminal adapter, or the like.

For example, the communication section 109 of the personal computer 13 as shown in FIG. 1 controls the communication performed with the projector 11 via the Ethernet (registered brand). Meanwhile, the communication section 109 of the personal computer 14 controls the serial communication performed with the projector 11. In addition, the communication section 109 may be connected to the network 15 as shown in FIG. 1, such as the Internet, to control communication performed with another device connected to the network 15.

A drive 110 is also connected to the input/output interface 105 as necessary. A removable medium 111, such as a magnetic disk, an optical disc, a magneto-optical disk, or a semiconductor memory, is mounted on the drive 110 as appropriate. A computer program is read from the removable medium 111 and installed into the storage section 108 as necessary.

Further, the above-described series of processes, e.g., the lamp adjustment process as shown in FIG. 2, can be performed not only by a circuit, such as the CPU 21 in FIG. 1 or the CPU 101 in FIG. 7, that performs the control processes using software, but also by a hardware circuit that performs the control processes using hardware. Note that the circuit that performs the control processes using the software and the circuit that performs the control processes using the hardware will be herein referred to collectively as a "control circuit".

In other words, the above-described series of processes can be performed by either the hardware or the software.

In the case where the series of processes is performed by the software, a program that constitutes the software is installed from the network or a storage medium into a computer that has a dedicated hardware configuration or a general-purpose personal computer that, when various programs are installed thereon, are capable of performing various functions, for example.

Examples of such a storage medium that stores the program include: the removable storage medium (packaged medium) 111 as shown in FIG. 7, which is delivered separately from a body of the device in order to provide the program to a viewer, such as the magnetic disk (including a floppy disk), the optical disc (including a compact disk-read only memory (CD-ROM) and a digital versatile disk (DVD)), the magneto-optical disk (including a Mini-Disk (MD)), or the semiconductor memory; and the ROM 102 or the hard disk contained in the storage section 108, which is originally contained in the body of the device and thus provided to the viewer.

Note that the steps described in the program stored in the storage medium may naturally be performed chronologically in the order described in the present specification, but do not need to be performed chronologically. Some of the steps may be performed in parallel or independently of one another.

An exemplary case where the present embodiment is applied to the digital cinema has been described above. Note, however, that the present embodiment has other applications than the digital cinema. Also note that the present embodiment is applicable not only to the projector but also, more generally, to image forming apparatuses that cause images to be formed on the image-projected object. In other words, the projector 11 for the digital cinema as shown in FIG. 1 is merely one example of such image forming apparatuses, with the screen 12 adopted as the image-projected object.

It is desirable to perform control so that the brightness on the image-projected object will be kept at the target brightness value. In such control, an object of the control is the image formed on the image-projected object, and therefore, a controlled variable is commonly the brightness on the image-projected object. In the existing method of the control, the controlled variable is the brightness on the image-projected object.

In the case where the brightness on the image-projected object is used as the controlled variable, however, the user must take the trouble to move to the vicinity of the image-projected object to manually measure the brightness on the image-projected object using the measuring instrument. This is a very cumbersome operation, and involves the need for complicated and costly control, as noted previously.

As such, in the above-described embodiment of the present invention, instead of the brightness on the image-projected object, a quantity that has a predetermined relationship with the brightness on the image-projected object, i.e., the lamp brightness, is adopted as the controlled variable. Then, the value of the lamp brightness corresponding to the value of the target brightness on the image-projected object is set as the reference brightness value, and the control is performed so that the value of the lamp brightness, which is the controlled variable, will be kept steady at the reference brightness value. For this purpose, the brightness sensor used to measure the lamp brightness, which is the controlled variable, is provided inside the image forming apparatus, whereby the above-described problem can be solved.

In the above-described embodiment of the present invention, the CPU 21 and the lamp power supply 23 are adopted as a control device for varying the lamp brightness, i.e., the controlled variable. One aim of this control is to keep the lamp brightness, i.e., the controlled variable, steady at the reference brightness value, and thereby keep the brightness on the image-projected object steady at the target brightness value. As long as this aim of the control is accomplished, the control device is not limited to any particular devices.

Specifically, it is possible to vary the lamp brightness by changing a location of a light source of the lamp, for example. As such, although not shown, a mechanism for changing the location of the light source of the lamp may be additionally provided in the image forming apparatus, as one of the control devices. In this manner also, the above-described aim of the control can be accomplished. A lamp location adjustment mechanism or the like as described in a specification and drawings originally attached with Japanese Patent Application No. 2007-060440, which has been filed by the present assignee in the Japanese Patent Office, may be adopted as such a mechanism, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus that emits a beam corresponding to an image onto an image-projected object to allow the image to be formed on the image-projected object, the apparatus comprising:

a lamp configured to serve as a light source for the beam emitted onto the image-projected object;

a lamp power supply configured to drive said lamp;

a lens configured to focus the beam emitted from said lamp upon the image-projected object;

a brightness sensor configured to measure brightness of direct or indirect light in a light path from said lamp to said lens, as a lamp brightness;

a memory configured to store, as a reference brightness value, said lamp brightness measured by said brightness sensor at a first time when brightness of the beam on the image-projected object has reached a target value; and a control circuit configured to control the image forming apparatus, wherein at a second time later than the first time, said control circuit performs first control of a) varying an output power of said lamp power supply and obtaining said lamp brightness measured by said brightness sensor for respective levels of the output power, b) generating or updating correspondence information that indicates a correspondence between a change in the output power of said lamp power supply and a change in said lamp brightness at the second time, based on the values obtained, and c) storing the generated or updated correspondence information in said memory, and at a third time later than the second time, said control circuit performs second control of loading the reference brightness value and the correspondence information from said memory, identifying a level of the output power of said lamp power supply corresponding to the reference brightness value based on the correspondence information, and driving said lamp power supply with the identified level of the output power.

2. The image forming apparatus according to claim 1, further comprising a reception circuit configured to receive a command issued from the image forming apparatus itself or an external device, wherein said control circuit further performs control in accordance with the command received by said reception circuit.

3. The image forming apparatus according to claim 2, wherein if a save command for causing said reference brightness value to be stored in said memory is issued and received by said reception circuit at the first time, said control circuit performs third control of obtaining said lamp brightness measured by said brightness sensor and storing the value obtained in said memory as the reference brightness value.

4. The image forming apparatus according to claim 2, wherein if a calibration command for generating or updating the correspondence information is issued and received by said reception circuit at the second time, said control circuit performs the first control.

5. The image forming apparatus according to claim 4, wherein when said control circuit has changed the output power of said lamp power supply from a first level to a second level during the first control, said control circuit obtains said lamp brightness corresponding to the second level of the output power from said brightness sensor after a predetermined period of time has elapsed since the change in the output power of said lamp power supply.

6. The image forming apparatus according to claim 5, wherein said control circuit obtains a plurality of values of the lamp brightness measured by said brightness sensor for the second level of the output power, performs a predetermined operation using the plurality of values, and obtains a value obtained by the predetermined operation as said lamp brightness corresponding to the second level of the output power.

7. The image forming apparatus according to claim 2, wherein
if a load command for causing the reference brightness value and the correspondence information to be loaded from said memory is issued and received by said reception circuit at the third time, said control circuit performs the second control.

8. The image forming apparatus according to claim 1, wherein
the image forming apparatus is a projector with a screen adopted as the image-projected object.

9. A method of controlling an image forming apparatus that emits a beam corresponding to an image onto an image-projected object to allow the image to be formed on the image-projected object, the image forming apparatus including
a lamp configured to serve as a light source for the beam emitted onto the image-projected object,
a lamp power supply configured to drive the lamp,
a lens configured to focus the beam emitted from the lamp upon the image-projected object,
a brightness sensor configured to measure brightness of direct or indirect light in a light path from the lamp to the lens, as a lamp brightness, and
a memory configured to store, as a reference brightness value, said lamp brightness measured by the brightness sensor at a first time when brightness of the beam on the image-projected object has reached a target value, the method comprising the steps of:
at a second time later than the first time, performing control of a) varying an output power of the lamp power supply and obtaining said lamp brightness measured by the brightness sensor for respective levels of the output power, b) generating or updating correspondence information that indicates a correspondence between a change in the output power of the lamp power supply and a change in said lamp brightness at the second time, based on the values obtained, and c) storing the generated or updated correspondence information in the memory; and
at a third time later than the second time, performing control of loading the reference brightness value and the correspondence information from the memory, identifying a level of the output power of the lamp power supply corresponding to the reference brightness value based on the correspondence information, and driving the lamp power supply with the identified level of the output power.

10. A program for causing a computer that controls an image forming apparatus that emits a beam corresponding to an image onto an image-projected object to allow the image to be formed on the image-projected object, the image forming apparatus including
a lamp configured to serve as a light source for the beam emitted onto the image-projected object,
a lamp power supply configured to drive the lamp,
a lens configured to focus the beam emitted from the lamp upon the image-projected object,
a brightness sensor configured to measure brightness of direct or indirect light in a light path from the lamp to the lens, as a lamp brightness, and
a memory configured to store, as a reference brightness value, said lamp brightness measured by the brightness sensor at a first time when brightness of the beam on the image-projected object has reached a target value,
the program causing the computer to perform the steps of:
at a second time later than the first time, performing control of a) varying an output power of the lamp power supply and obtaining said lamp brightness measured by the brightness sensor for respective levels of the output power, b) generating or updating correspondence information that indicates a correspondence between a change in the output power of the lamp power supply and a change in the said lamp brightness at the second time, based on the values obtained, and c) storing the generated or updated correspondence information in the memory; and
at a third time later than the second time, performing control of loading the reference brightness value and the correspondence information from the memory, identifying a level of the output power of the lamp power supply corresponding to the reference brightness value based on the correspondence information, and driving the lamp power supply with the identified level of the output power.

* * * * *